2,948,947

METHOD FOR MANUFACTURING REINFORCED LIGHTWEIGHT CONCRETE

John Valter Berg, Gavle, and Carl Gustav Harald Stare, Skelleftehamn, Sweden, assignors, by mesne assignments, to Casius Corporation Limited, Montreal, Quebec, Canada No Drawing. Filed Nov. 10, 1955, Ser. No. 546,258

Claims priority, application Sweden Dec. 10, 1954

3 Claims. (Cl. 25—154)

This invention relates to a method for the manufacture of reinforced lightweight concrete bodies of the kind which are rendered porous by the addition of gas developing agents.

This invention is directed especially to lightweight concrete to which high strength properties have been imparted by steam curing at a high temperature. This lightweight concrete is generally produced with the aid of gas developing substances, generally, aluminium powder, whereby the lightweight concrete is given its characteristic porosity. When preparing the light-weight concrete mixture, the gas developing substance is added at a late stage of the mixing process, so that development of the gas will have scarcely begun when the mass is poured into moulds. This gas development then takes place in the mould, so that the mass expands and rises, and finally reaches the upper edge of the mould.

This type of lightweight concrete is often provided with a reinforcement consisting of reinforcing iron or other metallic rods or bars embedded in the concrete, and generally welded together to form reinforcing mats or cages with horizontally running rods. The method hitherto used for producing reinforced concrete has consisted in introducing the reinforcing cages or mats into the mould, and fixing them in rows in relation to the mould before the mass of lightweight concrete is poured in. In most cases, the reinforcements are thereby partly embedded in the freshly poured in mass to become, finally, entirely enveloped by the mass on expansion of the latter.

On expansion, the mass will move in relation to the reinforcing iron rods, which gives rise to disturbance in the development of pores around and in the mass above each iron. This in turn results, first, in poor adhesion between the mass of lightweight concrete and the reinforcing irons, and second, in crack indications in the finished lightweight concrete.

It has hitherto been possible to counteract these drawbacks only partially through the choice of suitable raw materials, and through the adoption of various measures which insure in the expanding mass of lightweight concrete precisely the consistency that will give the closest envelopment of the iron rods. These measures, however, have not always led to the desired result, and it has, moreover, often proved necessary in this connection to neglect, to some extent, other important requirements, e.g., the strength properties, and the pore structure of the concrete.

The object of the present invention is to eliminate these drawbacks, and the invention relates to a method by means of which it is possible to produce a reinforced lightweight concrete which perfectly envelops the reinforcing iron rods without it being necessary to pay any special attention to the properties of the mass of concrete.

With the foregoing and other objects in view as will appear from a reading of the following specification and claims, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. It will be further understood that our invention is susceptible of embodiment in many and various forms, some of which are illustrated in the accompanying drawing, and that the structural details or particular steps of the method herein set forth may be varied to suit particular purposes and still remain within our inventive concept.

According to the invention, this is attained by placing the reinforcements into their final position in the mass of lightweight concrete at the stage when the pore forming process is in its final phase, or later. In this way no essential disturbances occur in connection with the pore formation in the mass, nor any formation of crack indications appear.

When applying the invention in practice, it is possible to proceed in different ways. Thus, for example, the reinforcing system may be introduced into the mould only after the mass of lightweight concrete has been poured in, and the expansion has proceeded to the stage indicated. In this connection it is necessary to take into account the fact that the mass of the concrete gradually stiffens as a result of the binding agent's setting reactions, so that it fairly soon attains a consistency that no longer permits it to be exposed to mechanical action without being damaged. With regard to the individual consistencies of different lightweight concrete masses, it is, therefore, necessary to judge the optimum point of time for the insertion of the reinforcements. Thus, as regards lightweight concrete mixtures on the basis of cement and sand, for example, it has been found that the best result is attained when the reinforcing system is lowered just when the expansion has come to an end or somewhat earlier. This could occur, for instance, in a 50 cm. high mould when there is still an interval of 1–3 cm. between the upper edge of the mould and the rising mass. In mixtures with slowly acting binding agents, e.g., ground blast furnace slag, it may often be advantageous to postpone the introduction of the reinforcing irons until later, e.g., half an hour after the expansion has stopped.

If the organization of the work in the light-weight concrete factory makes it difficult to lower the entire reinforcing system at a certain point of time, it is also possible to proceed in such a way that the reinforcements are inserted and assembled in the empty mould in the usual way. Subsequently, the lightweight concrete mass is poured in and allowed to expand, whereupon at a suitable point in relation to the process of pore formation, as indicated above, the reinforcing system is lifted upwards in the mass and afterwards lowered again. It is, however, not necessary to lift the reinforcing mats or cages completely out of the mass, but only so much that the elevation at least corresponds to the vertical distance between two horizontal reinforcing iron rods in the mat or cage. If these iron rods or metallic bars are lying at uneven intervals, the greatest distance between two adjacent irons should constitute the norm for the required elevation or movement. The effect in connection with this mode of procedure will be the same as that attained with the first mentioned application of my invention, producing lightweight concrete bodies with an even porosity in the mass, and good adhesion between the reinforcing iron rods and the lightweight concrete. Consequently, improved qualities of strength are obtained.

It is clearly an unusual and unobvious effect that a better envelopment of the reinforcement is obtainable when the reinforcement is lowered into the concrete mass at a stage at which the expansion of the mass is near its final phase, than if the mass is allowed to expand around an immovable reinforcement. As conceivable reasons herefor, the following explanations may be suggested: When the mass expands around the immovable rods of the reinforcement, this takes place comparatively slowly and there is sufficient time for the formation of voids above the rods. On the other hand, when the reinforcement is lowered (or elevated and again lowered), according to this invention, relative movement between the reinforcement and the mass is so rapid that any voids, if formed, are split into small bubbles. It is also conceivable that the formation of the voids occurs only at a certain stage of the expansion and the pore forming process, and that this stage has already passed when the reinforcement is lowered.

Earlier it has been suggested that after the lightweight concrete mass has expanded upwardly and around the reinforcing system, an improvement in the envelopment of the reinforcing iron rods by the concrete may be brought about by causing the reinforcing system, or the lightweight concrete mass, or both, to vibrate. Experiments have shown, however, that this vibration frequently impairs rather than improves the envelopment of the iron rods.

Nevertheless, this principle of vibration may advantageously be applied, in combination with the method according to the present invention. In this connection the reinforcing system itself should be made to vibrate while being lowered into the mass, and only then. This measure is particularly useful if the lightweight concrete mass has pronouncedly thixotropic properties, e.g., if ground sand with a high content of feldspar is used, or if the binding agent has similar properties, e.g. comprises hydraulic lime.

What we claim is:

1. A method for manufacturing reinforced lightweight concrete products which comprises positioning a reinforcement within a mold, casting a lightweight concrete mass containing a gas developing agent into the mold about the reinforcement, allowing the concrete to expand by the development of gas bubbles in the mass, raising the reinforcement, and then lowering it at a time at which the expansion of the mass and the gas developing process is in its final phase.

2. A method for manufacturing reinforced lightweight concrete products, which comprises positioning a reinforcing mat containing horizontal reinforcing rods within a mold, casting a lightweight concrete mass containing a gas developing agent into the mold about the reinforcing mat and allowing the concrete to expand by the development of gas bubbles in the mass forming pores, raising the reinforcing mat and then lowering it at a time at which the expansion of the mass and the pore-forming process is in its final phase.

3. A method as set forth in claim 2 wherein the height of the elevation and retraction corresponds at least to the greatest vertical distance between two adjacent horizontal rods in the reinforcing mat.

References Cited in the file of this patent

UNITED STATES PATENTS

| 1,690,474 | Cafferata | Nov. 6, 1928 |
| 1,804,753 | Douglas | May 12, 1931 |
| 2,892,498 | Adams | Dec. 27, 1932 |
| 2,038,034 | Fowler et al. | Apr. 21, 1936 |
| 2,175,895 | Hybineete | Oct. 10, 1939 |
| 2,301,062 | Long | Nov. 3, 1942 |
| 2,425,883 | Jackson | Aug. 19, 1947 |
| 2,522,116 | Hayes | Sept. 12, 1950 |
| 2,732,607 | Dodd | Jan. 31, 1956 |

FOREIGN PATENTS

| 445,628 | Great Britain | Apr. 16, 1936 |
| 492,280 | Great Britain | Sept. 16, 1938 |